(12) United States Patent
Sweere et al.

(10) Patent No.: US 6,354,549 B2
(45) Date of Patent: Mar. 12, 2002

(54) RATCHETED PIVOT

(75) Inventors: Harry C. Sweere, Minneapolis; Dennis M Scheller, Burnsville; Robert W. Fluhrer, Prior Lake, all of MN (US)

(73) Assignee: Ergotron, Inc., Eagan, MN (US)

( * ) Notice: Subject to any disclaimer, the term of this patent is extended or adjusted under 35 U.S.C. 154(b) by 0 days.

(21) Appl. No.: 09/432,331

(22) Filed: Nov. 2, 1999

(51) Int. Cl.$^7$ .................................................. E04G 3/00
(52) U.S. Cl. .................................................. 248/292.14
(58) Field of Search ................ 248/292.12, 292.13, 248/220.22, 292.14, 220.21

(56) References Cited

U.S. PATENT DOCUMENTS

| | | | | |
|---|---|---|---|---|
| 5,320,311 A | * | 6/1994 | Jensen et al. | 248/27.1 |
| 5,765,794 A | * | 6/1998 | Chen | 248/292.12 |
| 5,823,487 A | * | 10/1998 | Kirchhoff et al. | 248/118 |
| 5,964,443 A | * | 10/1999 | Leveille | 248/478 |
| 6,019,332 A | * | 2/2000 | Sweere et al. | 248/284.1 |
| 6,079,949 A | * | 6/2000 | Litvin | 248/292.12 X |

* cited by examiner

Primary Examiner—Leslie A. Braun
Assistant Examiner—A. Joseph Wujciak
(74) Attorney, Agent, or Firm—Schwegman, Lundberg, Woessner & Kluth, P.A.

(57) ABSTRACT

Ratcheted pivot incorporating large and small areas of frictional contact and a ratcheting mechanism to provide for rotational repositioning of a mounting plate and a load about a horizontal axis.

19 Claims, 5 Drawing Sheets

RATCHETED PIVOT

BACKGROUND OF THE INVENTION

1. Field of the Invention

The present invention is for a pivot, and more particularly, pertains to a pivot incorporating a ratchet for reduced force operation about the pivot

2. Description of the Prior Art

Prior art pivot devices which support a load about a horizontal pivot axis often provided frictional schemes which required substantial amounts of force to rotate or lift a load in the upward position where a large amount of friction must first be overcome before ascent of the payload was possible.

The present invention provides a ratcheted pivot which overcomes the drawbacks of the prior art by providing a ratcheted pivot which provides a free-wheeling or reduced friction action when the payload is moving upward but maintains full friction control when the payload is moved downward.

SUMMARY OF THE INVENTION

The general purpose of the present invention is a ratcheted pivot.

According to an embodiment of the present invention there is provided a ratcheted pivot which dramatically reduces the effort or force required to move a friction controlled payload in the upward direction.

One significant aspect and feature of the present invention is a ratcheted pivot which is easy to operate in an upward mode without having to overcome excessive friction.

Another significant aspect and feature of the present invention is a ratchet pawl engaging ratchet disks to support a load.

Another significant aspect and feature of the present invention is the use of small and large areas of frictional contact.

Another significant aspect and feature of the present invention is to provide desired frictional control in either direction and thus provide payload stability in any position.

Having thus described an embodiment of the present invention it is the primary objective hereof to provide a ratcheted pivot.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
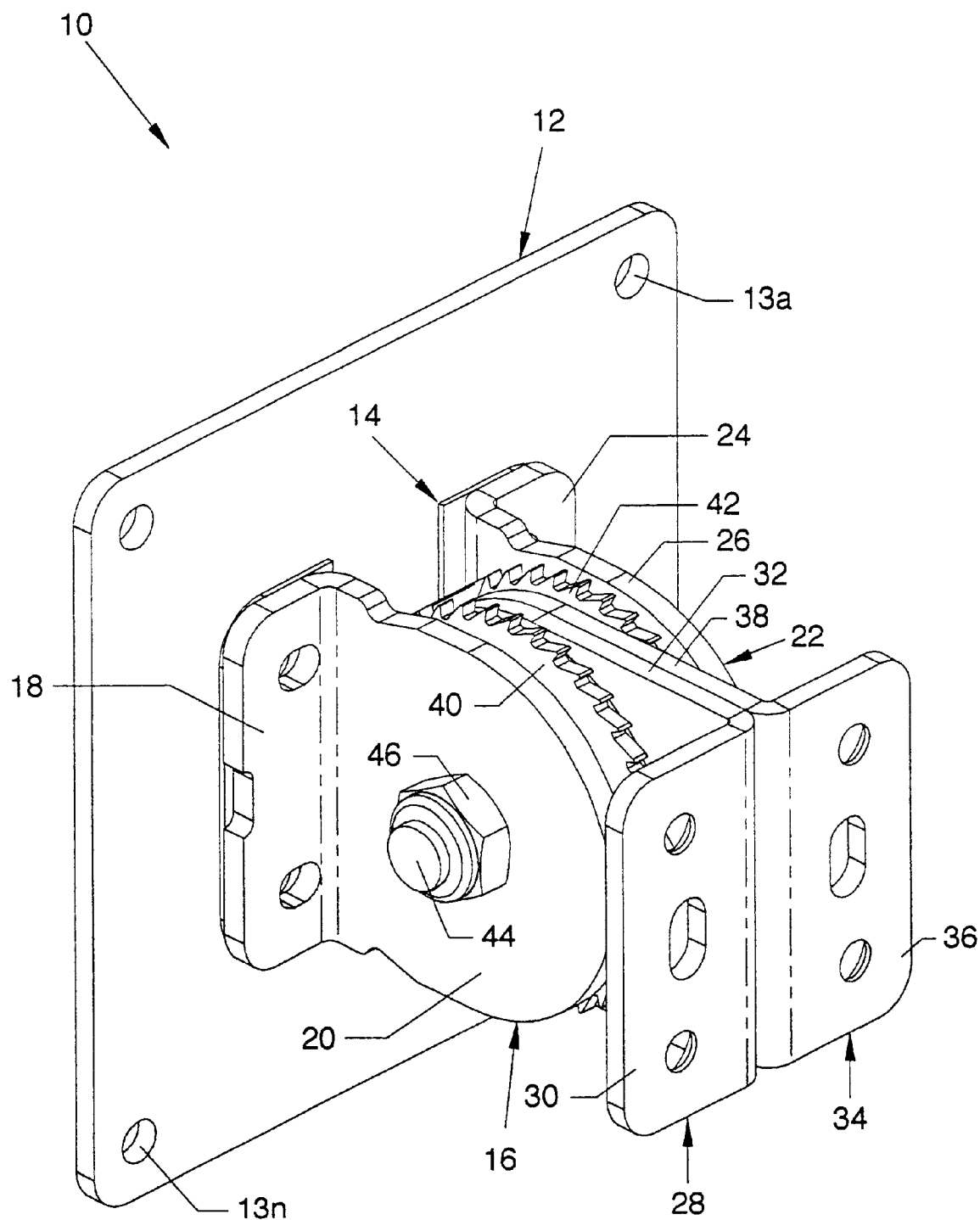
FIG. 1 illustrates an isometric view of a ratcheted pivot.
Figure 2:
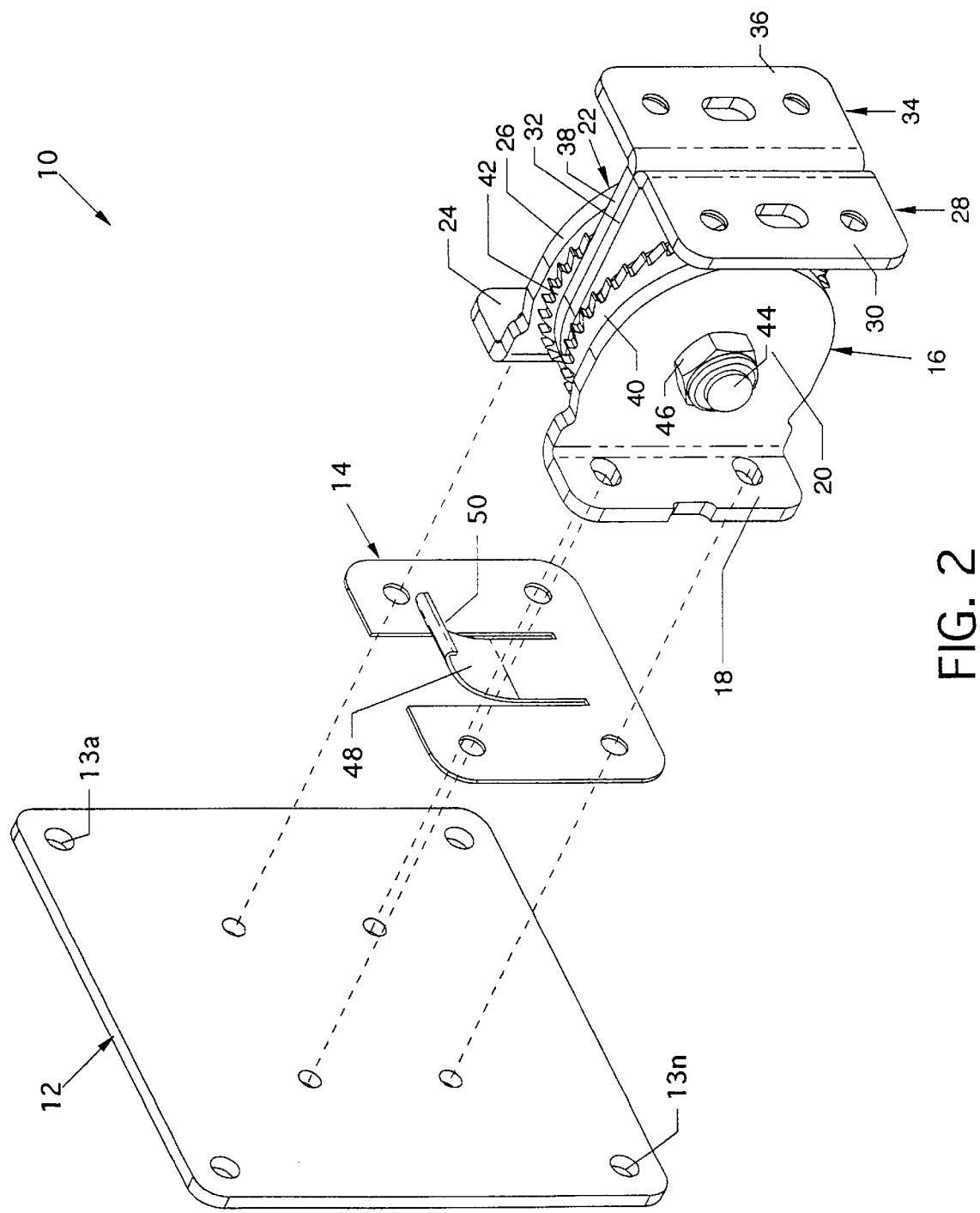
FIG. 2 illustrates a semi-exploded isometric view of the ratcheted pivot.
Figure 3:
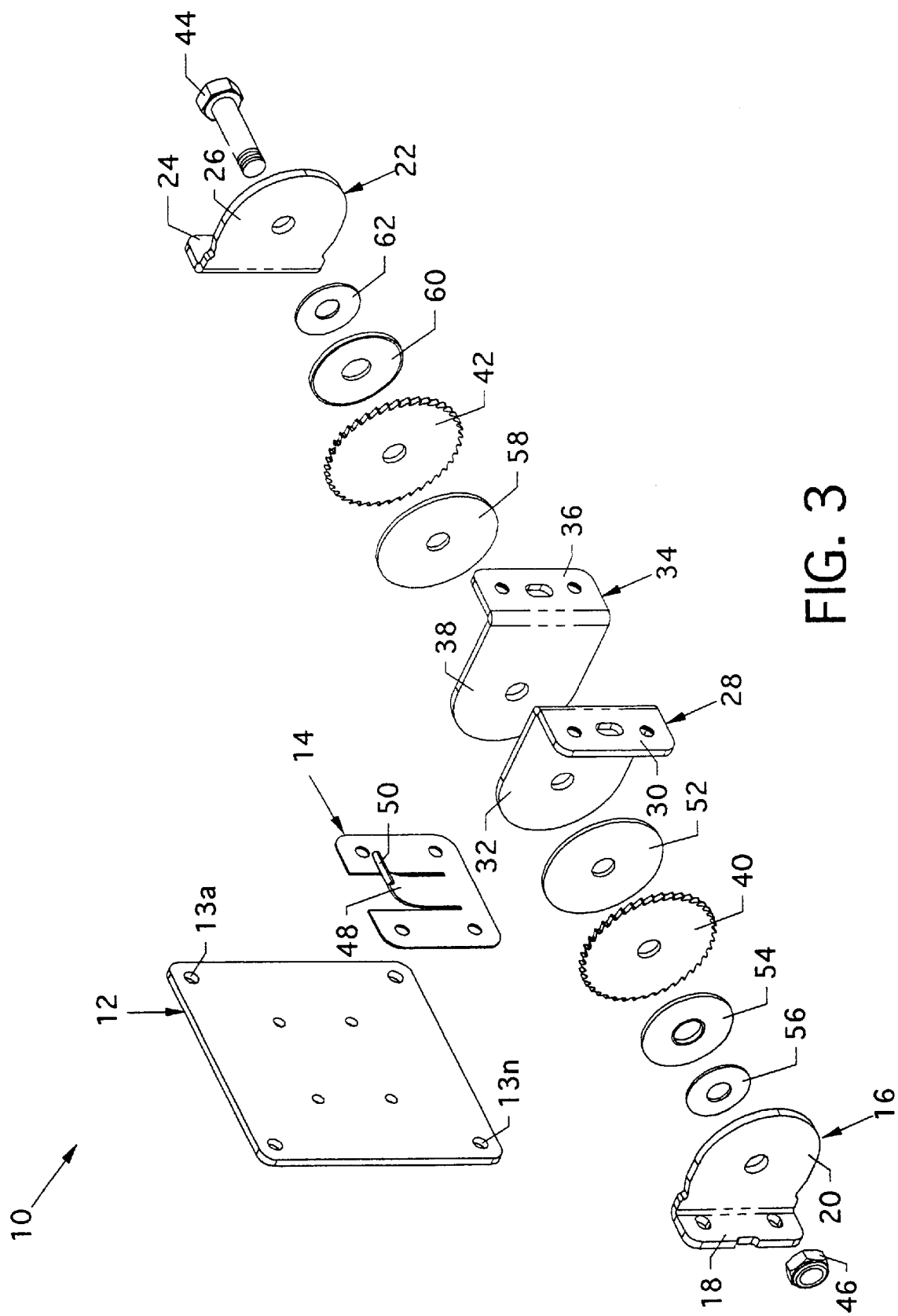
FIG. 3 illustrates an exploded isometric view of the ratcheted pivot.

FIG. 1 illustrates an isometric view of a ratcheted pivot 10, the present invention. Fully or partially visible components visible in the illustration include a mounting plate 12 having a plurality of mounting holes 13a–13n, a spring plate 14 aligned to the mounting plate 12, a left outer angled bracket 16 aligned to a portion of the spring plate 14 and having a mounting tab 18 and a rounded planar pivot tab 20 extending at a right angle from the mounting tab 18, a right outer angled bracket 22 aligned to a portion of the spring plate 14 and having a mounting tab 24 and a rounded planar pivot tab 26 extending at a right angle from the mounting tab 24, a left inner angled bracket 28 having a mounting tab 30 and a rounded planar pivot tab 32 extending at a right angle from the mounting tab 30, a right inner angled bracket 34 juxtaposing the left inner angled bracket 28 having a mounting tab 36 and a rounded planar pivot tab 38 extending at a right angle from the mounting tab 36, a left ratchet disk 40 and other components not visible located between the rounded planar pivot tab 20 of the left outer angled bracket 16 and the rounded planar pivot tab 32 of the left inner angled bracket 28, a right ratchet disk 42 and other components not visible located between the rounded planar pivot tab 38 of the right inner angled bracket 34 and the rounded planar pivot tab 26 of the right outer angled bracket 22. As illustrated in FIGS. 1, 2 and 3, pluralities of holes are utilized in the left and right outer angled brackets 16 and 22, in the spring plate 14 and in the mounting plate 12 for mutual securing by appropriate hardware. A pivot bolt 44 extends through the left and right outer angled brackets 16 and 22, the left and right inner angled brackets 28 and 34, the left and right ratchet disks 40 and 42 and through other components, as later illustrated in detail, and is secured by a nut 46.

FIG. 2 illustrates a semi-exploded isometric view of the ratcheted pivot 10, where all numerals mentioned before correspond to those elements previously described. Illustrated in particular is the spring plate 14 which interfaces with the left and right ratchet disks 40 and 42, as shown later in detail. A spring 48, which is curved and which includes a pawl 50 at its end and which is centrally located, extends from the planar region of the spring plate 14.

FIG. 3 illustrates an exploded isometric view of the ratcheted pivot 10, where all numerals mentioned before correspond to those elements previously described. Illustrated in particular are the components aligned between the left inner angled bracket 28 and the left outer angled bracket 16, as well as like and corresponding components mirroring those components which align between the right inner angled bracket 34 and the right outer angled bracket 22. Aligned between the left inner angled bracket 28 and the left outer angled bracket 16, are a large UHMWPE (ultra high molecular weight polyethylene) disk 52, the left ratchet disk 40, a Belleville washer 54, and a UHMWPE disk 56 being of lesser diameter than the UHMWPE disk 52. Aligned between the right inner angled bracket 34 and the right outer angled bracket 22 are a large UHMWPE disk 58, the right ratchet disk 42, a Belleville washer 60, and a UHMWPE disk 62 being of lesser diameter than the UHMWPE disk 58. Pivot bolt 44 aligns through centrally located holes in the left and right UHMWPE disks 52 and 58, left and right ratchet disks 40 and 42, Belleville washers 54 and 60, UHMWPE disks 56 and 62 and through holes in the rounded planar pivot tabs 20, 32, 38 and 26 of the left outer angled bracket 16, the left inner angled bracket 28, the right inner angled bracket 34 and the right outer angled bracket 22, respectively, and engages the nut 46 which is tightened to apply pressure across the assembly shown in FIG. 4.

Figure 4:
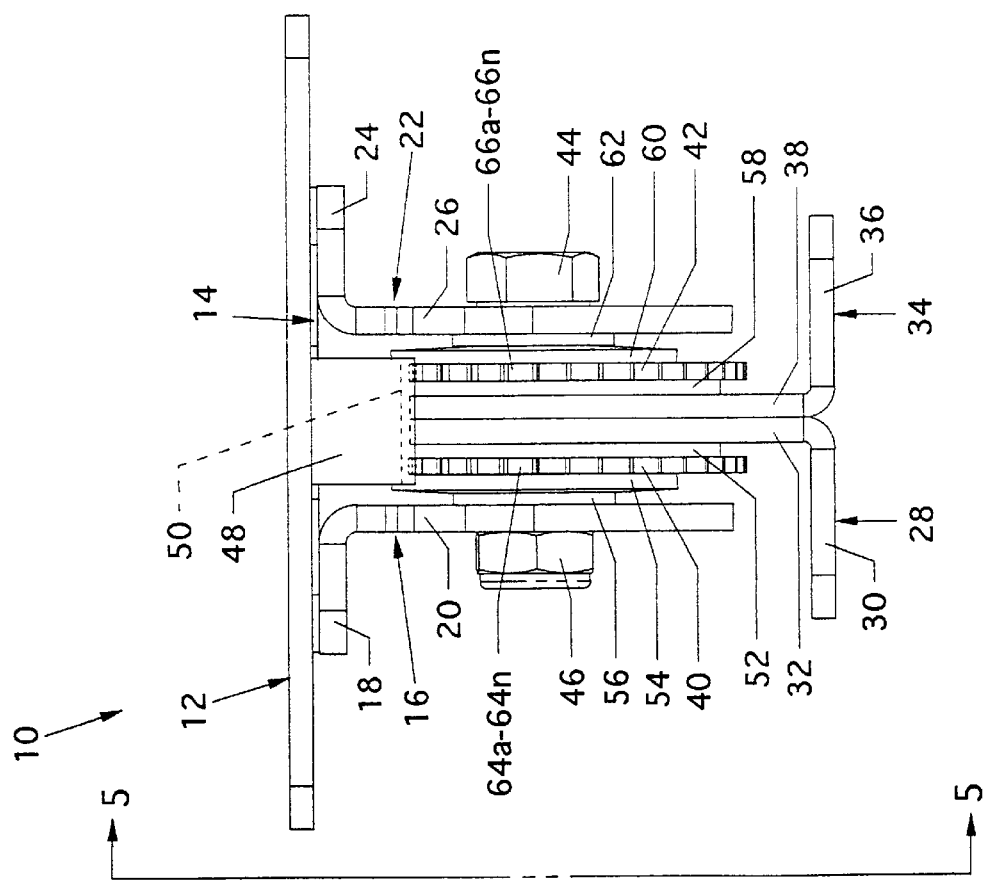
FIG. 4 illustrates a top view of the ratcheted pivot.

FIG. 4 illustrates a top view of the ratcheted pivot 10, where all numerals mentioned before correspond to those elements previously described. Pawl 50 extending from the spring 48 is shown engaging the teeth of the opposing left and right ratchet disks 40 and 42.

Figure 5:
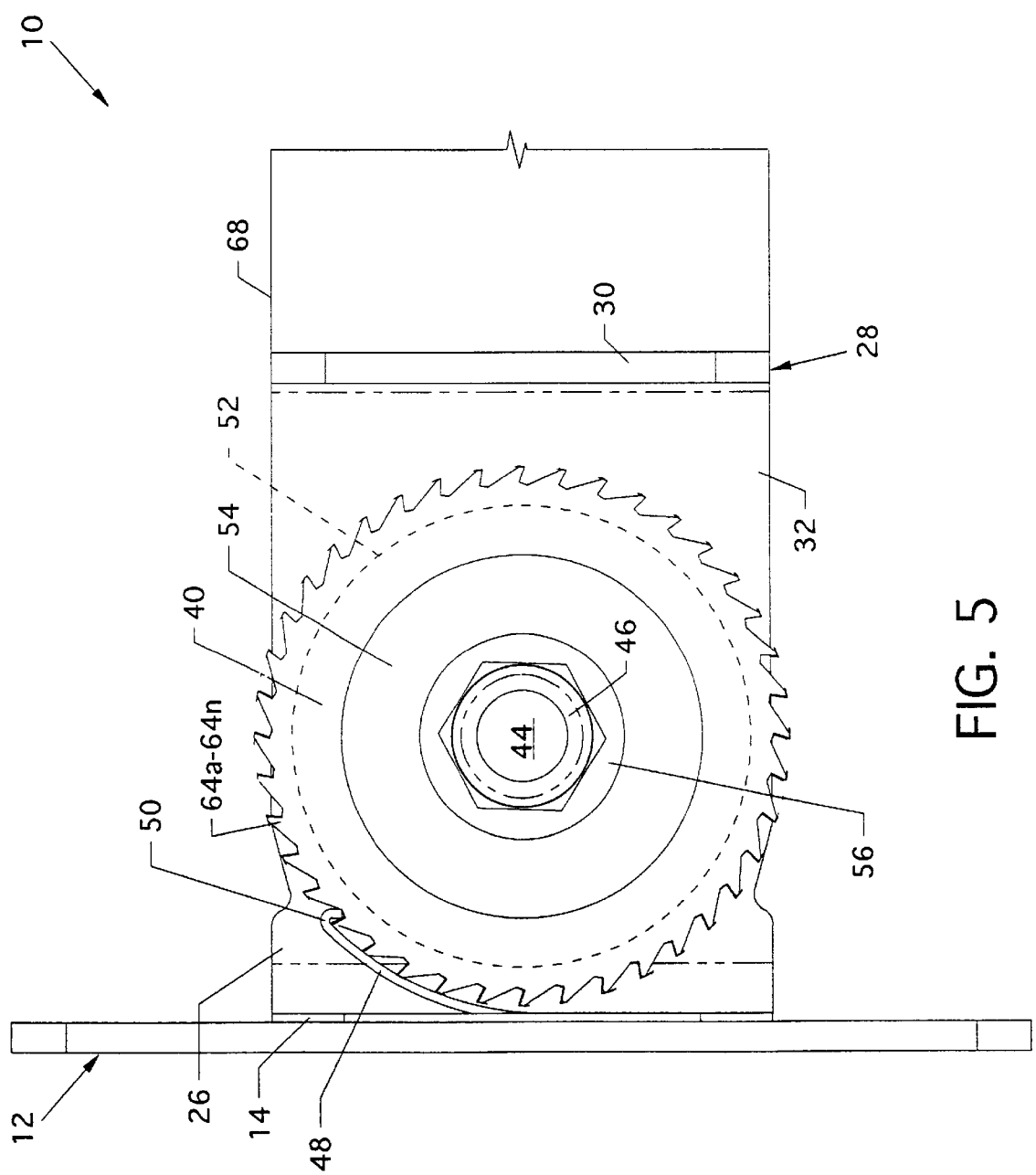
FIG. 5 illustrates a side view of the ratcheted pivot along line 5—5 of FIG. 4 with the left outer angled bracket removed.

FIG. 5 illustrates a side view of the ratcheted pivot 10 along line 5—5 of FIG. 4 with the left outer angled bracket 16 removed. Illustrated in particular is the pawl 50 of spring 48 engaging the teeth 64a–64n of the left ratchet disk 40, as well as engaging the teeth 66a–66n of the right ratchet disk 42 (not illustrated). The spring 48 and pawl 50 offer non-impeded rotation of the left and right rounded planar pivot tabs 20 and 26 in a clockwise direction about the horizontal pivot axis, as represented by the pivot bolt 44. Also shown is one end of a mounting structure 68 utilized to support the ratcheted pivot 10 and a load attached thereto.

MODE OF OPERATION

The operation of the ratcheted pivot 10 provides for rotation of a monitor of other device which secures to the mounting plate 12 about the horizontal axis described by the pivot bolt 44. Rotation is made about the horizontal axis to rotatingly position the mounting plate 12 to gain a desired angle of adjustment suitable for use with the load provided by the monitor or other device supported by the ratcheted pivot 10. Movement and rotation in two directions are provided for. Pivot bolt 44 and nut 46 are tightened across the assembled components of the ratcheted pivot 10 to provide suitable friction to stabilize the ratcheted pivot 10 and the load attached to the mounting plate 12 to prevent the ratcheted pivot 10 and attached load from weight induced rotation about the pivot bolt 44. Friction is applied across the ratcheted pivot 10 in general to bring together components in repositional frictional engagement having relatively small or relatively large areas of contact. An area of large contact is provided by the left and right ratchet disks 40 and 42 which forcibly contact the adjoining UHMWPE washers 52 and 58 and the Belleville washers 54 and 60. An area of small contact is provided by that of the UHMWPE washers 56 and 62 which forcibly contact the adjoining Belleville washers 54 and 60 and the rounded planar pivot tabs 20 and 26, respectively. Due to the small areas of contact, relatively little effort is required to overcome the friction therein to rotate and position the mounting plate 12 and load in a clockwise direction, as viewed in FIG. 1 or FIG. 5. Once the friction at the small area is overcome, an effort just slightly exceeding the weight of the load must be incorporated for repositioning. During this rotation, the pawl 50 at the end of the spring 48 bypasses secure engagement with the teeth 64a–64n and 66a–66n of the left and right ratchet disks 40 and 42 until the desired position is reached at which point pawl 50 engages teeth 64a–64n and 66a–66n in a secure fashion to prevent reverse rotation of the mounting plate 12, the left and right outer angled brackets 16 and 22 and the attached load to provide secured rotational positioning in the upward direction. The area of large contact area of the left and right ratchet disks 40 and 42 to which the pawl 50 is engaged provides for sufficient frictional holding power to retain the load in the desired position. Rotational repositioning and lowering of the load in a counterclockwise fashion, as viewed in FIG. 1 or FIG. 5, is accomplished by incorporating the weight of the load in addition to manual urging to overcome the large areas of contact adjoining the left and right ratchet disks 40 and 42. The downward force is transferred from the manually actuated mounting plate 12 (and load) to the spring 48 which, in engagement with the left and right ratchet disks 40 and 42, transfers force to the left and right ratchet disks 40 and 42 to cause them to overcome the area of large friction to cause downward and rotational repositioning of the left and right outer angled brackets 16 and 22.

It can be appreciated that almost infinitesimal positionings of the ratcheted pivot 10 and its load, which could include a flat panel display, are available, and that the position of the load, which is adjustable, would be retained in the position selected by the user. If the user wishes to tiltingly display the load upwardly or downwardly, the load must be manually repositioned to overcome the friction imposed by the ratcheted pivot 10. Once the load (display) is moved to a different position, the unique tilt restraining devices inherent in the ratcheted pivot 10 will suitably restrain the load in the new position as selected. Sufficient friction to maintain position of the load during use is provided but allows easy "breakaway" release to reposition the load to a new operating position. The unique characteristics of the polymer UHMWPE disks 56, 52, 58 and 62 combined with the pressure supplied by the Belleville washers 54 and 60 allow smooth adjustment of the load and yet provide a constant frictional memory for the present position of the load in conjunction with the ratchet disks 40 and 42 in conjunction with the spring 48 and pawl 50.

Various modifications can be made to the present invention without departing from the apparent scope hereof.

It is claimed:

1. A pivot system, comprising:
   a first mounting plate, having a hinge axis;
   a second mounting plate operatively connected to the first mounting plate, the second mounting plate rotating relative to the first mounting plate about the hinge axis;
   a first sliding friction device coupled to the first and second mounting plates, the first sliding friction device imposing a first direction rotation resistance on the first and second mounting plates; and
   a second sliding friction device, coupled to the first and second mounting plates, imposing a second direction rotation resistance on the first and second mounting plates that is less than the first direction rotation resistance.

2. The pivot system of claim 1, wherein the first sliding friction device comprises a first friction washer and the second sliding friction device comprises a second friction washer.

3. The pivot system of claim 2, wherein the first friction washer has a smaller contact area than the second friction washer.

4. The pivot system of claim 2, wherein the first and second friction washers comprise a polymer material.

5. The pivot system of claim 4, wherein the polymer material comprises ultra high molecular weight polyethylene.

6. A pivot system, comprising:
   a first mounting plate, having a hinge axis;
   a second mounting plate operatively connected to the first mounting plate, the second mounting plate rotating relative to the first mounting plate about the hinge axis;
   a toothed array, having a plurality of teeth, the toothed array rotating about the hinge axis;
   a tooth engaging device located adjacent to the toothed array that engages the teeth of the toothed array such that only a first direction of rotation of the toothed array is permitted;
   a first sliding friction device, coupled to the first and second mounting plates, imposing a first direction rotation resistance on the first and second mounting plates; and a second sliding friction device, coupled to the first and second mounting plates, imposing a second direction rotation resistance on the first and second mounting plates that is less than the first direction rotation resistance.

7. The pivot system of claim 6, wherein the toothed array comprises a ratchet array.

8. The pivot system of claim 6, wherein the toothed array is located along the hinge axis and between the first mounting plate and the second mounting plate.

9. The pivot system of claim 6, wherein the tooth engaging device comprises at least one pawl.

10. The pivot system of claim 8, wherein the tooth engaging device further comprises a spring, and the spring forces the pawl against the ratchet array.

11. The pivot system of claim 10, wherein the spring and pawl are integrally formed.

12. A method of pivoting a workpiece comprising:
   attaching a first mounting plate to a foundation, the first mounting plate having a first pivot surface;
   attaching a second mounting plate to a workpiece, the second mounting plate having a second pivot surface;
   attaching a dual resistance sliding friction pivot between the first mounting plate and the second mounting plate;
   rotating the workpiece in a first direction, the rotation being resisted by a first frictional force; and
   rotating the workpiece in a second direction, the rotation being resisted by a second frictional force greater than the first frictional force.

13. The method of pivoting a workpiece of claim 12, wherein attaching the dual resistance sliding friction pivot comprises:
   placing a ratchet array between the first and second pivot surfaces; and
   attaching a ratchet engaging device adjacent to the ratchet array, the ratchet engaging device only allowing rotation of the ratchet array about the axis of rotation in one direction.

14. The method of pivoting a workpiece of claim 13, wherein attaching the dual resistance sliding friction pivot further comprises:
   selecting a first friction material and a second friction material;
   placing the first friction material in contact with the first pivot surface and the ratchet array;
   placing the second friction material in contact with the second pivot surface and the ratchet array.

15. The method of pivoting a workpiece of claim 14, wherein attaching the dual resistance sliding friction pivot further comprises fastening the first pivot surface, the first friction material, the ratchet array, the second friction material, and the second pivot surface together with a fastening assembly that defines an axis of rotation.

16. The method of pivoting a workpiece of claim 15, wherein fastening the first pivot surface, the first friction material, the ratchet array, the second friction material, and the second pivot surface together comprises fastening with a bolt and a nut.

17. The method of pivoting a workpiece of claim 14, wherein selecting the first friction material comprises selecting a first polymer washer and selecting the second friction material comprises selecting a second polymer washer.

18. The method of pivoting a workpiece of claim 17, wherein selecting the first polymer comprises selecting a first polymer washer having a first contact area, and selecting the second polymer washer comprises selecting a second polymer washer having a second contact area that is larger than the first contact area.

19. A pivot system comprising:
   a mounting plate;
   an assembly of components comprising:
      a first pair of pivot brackets defining a pivot axis, the first pair of pivot brackets attached to the mounting plate;
      a first pair of ultra high molecular weight polyethylene (UHMWPE) washers located along the pivot axis and between the first pivot brackets;
      a pair of spring washers located along the pivot axis and between the first pair of UHMWPE washers;
      a pair of ratchet arrays located along the pivot axis and between the pair of belleville washers;
      a second pair of UHMWPE washers having a larger contact area than the first pair of UHMWPE washers, the second pair of UHMWPE washers being located along the pivot axis and between the pair of ratchet arrays;
      a second pair of pivot brackets located along the pivot axis and between the second pair of UHMWPE washers;
   a bolt and nut fastening the assembly of components along the pivot axis; and
   a pawl assembly attached to the mounting plate, the pawl assembly engaging the pair of ratchet arrays and only allowing rotation of the pair of ratchet arrays in one direction about the pivot axis.

\* \* \* \* \*

UNITED STATES PATENT AND TRADEMARK OFFICE
CERTIFICATE OF CORRECTION

PATENT NO.   : 6,354,549 B2
DATED        : March 12, 2002
INVENTOR(S)  : Sweere et al.

It is certified that error appears in the above-identified patent and that said Letters Patent is hereby corrected as shown below:

Column 1,
Line 7, after "pivot" insert -- . --.
Line 34, delete "disks" and insert -- disk --, therefor.
Line 43, after "invention" insert -- , --.
Line 67, delete "10, the" and insert -- 10 of --, therefor.

Column 2,
Line 54, delete "22 are" and insert -- 22 is --, therefor.

Column 3,
Line 18, delete "monitor of" and insert -- monitor or --, therefor.

Column 5,
Line 13, delete "claim 8" and insert -- claim 9 --, therefor.

Signed and Sealed this

Eighth Day of October, 2002

Attest:

Attesting Officer

JAMES E. ROGAN
*Director of the United States Patent and Trademark Office*